United States Patent Office 3,356,505
Patented Dec. 5, 1967

3,356,505
POTENTIATION OF CHOCOLATE FLAVOR
WITH AMMONIATED GLYCYRRHIZIN
Robert J. Morris, Jr., Cherry Hill, N.J., assignor to Mac-Andrews & Forbes Company, Camden, N.J., a corporation of New Jersey
No Drawing. Filed Dec. 23, 1964, Ser. No. 420,770
8 Claims. (Cl. 99—26)

The present invention relates to the potentiation of the chocolate flavor of cocoa and to cocoa-containing edible materials in which the chocolate flavor imparted by the cocoa is potentiated by means of a small amount of a synergistic potentiating agent whereby the chocolate flavor is improved and strengthened or the amount of cocoa required to provide a given level of chocolate flavor may be reduced.

Many compounds are known to enhance particular flavors in foods, beverages and confections. Perhaps the most widely known and used compound of this type is monsodium glutamate which particularly enhances the flavor of meats and vegetables. Enhancement of flavor of this type is called "flavor potentiation."

It is the principal object of the present invention to provide a novel means for potentiating the chocolate flavor of cocoa.

It is another object of the invention to provide a novel means for potentiating the chocolate flavor of cocoa through the use of an essentially naturally occurring material.

Still another object of the invention is to potentiate the chocolate flavor of cocoa with a very small amount of an essentially naturally-occurring material whereby the amount of cocoa required to flavor any edible material to a given level may be reduced.

A further object is to provide novel cocoa-containing (chocolate-flavored) edible materials (foods, beverages and confections) containing a small amount of a flavor potentiating agent in which the chocolate flavor is improved and strengthened or in which the amount of cocoa is significantly less, for a given chocolate flavor level, than that required in the same edible material without the potentiating agent.

Other objects, including the provision of a novel chocolate flavoring agent, will become apparent from a consideration of the following specification and claims.

Licorice is a material long well known and widely used in many fields. The licorice root contains from about 6 to about 14% of a triterpenoid glycoside called glycyrrhizin. This compound is present in the root as the mixed calcium and potassium salts of glycyrrhizic acid.

Glycyrrhizin has a sweetness value about 50 times greater than that of sucrose and is perhaps the sweetest chemical processed commercially that is found in nature. Glycyrrhizic acid is obtained in 90% or more purity (Hausman assay) by grinding the root, extracting the ground material with hot water, and treating the extract to recover the acid insoluble fraction containing the glycyrrhizic acid. Glycyrrhizic acid can be ammoniated, to provide ammoniated glycyrrhizin, by replacing one or more of the three acid hydrogen atoms with ammonium. Ammoniated glycyrrhizin, therefore, ranges from a mono-ammoniated product to an essentially fully (tri) ammoniated product and mixtures thereof. Ammoniated glycyrrhizin is well known and widely used, and also has a sweetness value about 50 times that of sucrose.

Ammoniated glycyrrhizin has the characteristic licorice flavor and it is primarily for this that this material has found widespread use as flavoring agent in, for example, confections. This material has also been used in very minute quantities as foaming agent in carbonated soft drink beverages.

It has been found, however, and it is upon this that the present invention is based, that ammoniated glycyrrhizin potentiates the chocolate flavor of cocoa at levels which do not impart appreciably the licorice flavor. By "potentiate" is meant that the chocolate flavor of the combination of cocoa and ammoniated glycyrrhizin is equivalent to a substantially greater amount of cocoa alone, without the ammoniated glycyrrhizin. This will be illustrated hereinafter.

Accordingly, the present invention includes a method for potentiating the chocolate flavor of cocoa, including cocoa in cocoa-containing, chocolate-flavored edibles, by incorporating therein a small amount of ammoniated glycyrrhizin sufficient to potentiate the chocolate flavor but insufficient to impart the flavor of licorice.

The invention also includes novel chocolate flavored edible material (foods, beverages and confections) containing cocoa and ammoniated glycyrrhizin in the stated relative amounts.

The present invention further includes a novel chocolate flavoring agent consisting essentially of cocoa and ammoniated glycyrrhizin in the stated relative amounts.

Cocoa is the finely-grounded residue of cocoa seeds (Theobroma cacao) after expression of their fat. This brownish-red powder is the source of chocolate flavor and is used for this purpose in chocolate-flavored foods (like cakes, cookies, puddings and the like), beverages (like chocolate milk, hot chocolate drinks, and the like) and confections (like chocolate candies, fudges, icings, fillings, and the like). The present invention is applicable to all such edibles, including concentrates, mixtures and flavoring agents, and in the preparation of chocolate-flavored foods, beverages, and confections.

The following examples are given for the purpose of illustration only and are not intended to limit the scope of the invention in any way.

*Example I*

A beverage is prepared by mixing 20 parts, by weight, of cocoa, 100 parts, by weight, of sugar, 100 parts, by weight, of water and 0.5 part, by weight, of ammoniated glycyrrhizin. This is found to be equivalent in chocolate flavor to a beverage prepared from 25 parts of cocoa, 100 parts of sugar and 100 parts of water, without the ammoniated glycyrrhizin.

*Example II*

A chocolate fudge candy is prepared from 8 lbs. (3640 g.) of sugar (sucrose); 1½ lbs. (696 g.) of invert sugar; 8 lbs. (3640 g.) of fondant; six #2 cans (2.7 l.) of evaporated milk; 1 tablespoon (9 g.) of salt; 1 lb. (454 g.) of butter; ¼ teaspoon (0.5 g.) of vanillin; 5½ oz. (155 g.) of cocoa, and 1 teaspoon (4 g.) of ammoniated glycyrrhizin. This fudge has a chocolate flavor approximately comparable to an identical product made, however, using 6½ oz. (183 g.) of cocoa and no ammoniated glycyrrhizin.

*Example III*

A chocolate cake whose recipe calls for 2 cups of sugar (sucrose) and 10 tablespoons of cocoa was prepared using 1 cup of sugar and ½ teaspoon of ammoniated glycyrrhizin. This cake was found to have an enhanced chocolate flavor as compared to a cake made according to the same recipe but omitting the ammoniated glycyrrhizin. This cake also had a sweetness equivalent to the same cake prepared using 2 cups of sugar and without the ammoniated glycyrrhizin. The use of ammoniated glycyrrhizin to potentiate the sweetness of sucrose is disclosed and claimed in copending application Serial Number 413,351, filed November 23, 1964.

Example IV

A chocolate flavoring agent is prepared by mixing 0.1 part, by weight, of ammoniated glycyrrhizin with 84 parts, by weight, of a commercial chocolate syrup (containing sugar; water; corn syrup; cocoa; salt and vanillin). This is equivalent in chocolate flavor to 115 parts by weight of the chocolate syrup without the ammoniated glycyrrhizin. It will be seen that, as a chocolate flavoring agent, the cocoa and ammoniated glycyrrhizin may be associated with a diluent or extender which may provide a liquid base, like that used in preparing a chocolate syrup, or which may provide a solid base, like sugar, milk solids, and the like, of a type and in amounts that do not alter deleteriously the chocolate flavor. Hence, where reference is made herein to a chocolate flavoring agent consisting essentially or principally of cocoa and ammonated glycyrrhizin it will be understood to include flavoring agents containing such diluents or extenders.

Beverages were prepared from 20 parts, by weight, of cocoa, 100 parts, by weight, of sugar, 900 parts by weight of water and varying amounts of ammoniated glycyrrhizin to determine the range of proportions of ammoniated glycyrrhizin to cocoa to provide potentiation of the chocolate flavor without imparting significant licorice flavor. These preparations were then subjected to sensory testing using the "rank order test" and the "scalar difference from control test" as described in Food Technology, vol. 18, No. 8, August 1964, pages 25–31. As the result, it was determined that the critical proportions are not less than 1 and not more than 5 parts, by weight, of ammoniated glycyrrhizin per 100 parts, by weight, of cocoa.

As will be apparent from the foregoing, the amount of ammoniated glycyrrhizin incorporated in the edible material is related to the cocoa content which determines the chocolate flavor level for the particular food, beverage or confection. As will also be apparent, the particular edible material flavored in accordance with the present invention is not material, and any normally chocolate-flavored food, beverage or confection is applicable.

Modification is possible in the edible materials selected and flavored according to the present invention as well as in the particular techniques employed without departing from the scope of the invention as defined by the following claims.

What is claimed is:
1. The method of potentiating the chocolate flavor of cocoa which comprises combining with the cocoa a small amount of ammoniated glycyrrhizin to enhance the chocolate flavor but insufficient to provide the flavor of licorice.
2. The method of claim 1 wherein not less than 1 and not more than 5 parts by weight of ammoniated glycyrrhizin are combined per 100 parts of cocoa.
3. The method of potentiating the chocolate flavor of cocoa-containing, chocolate-flavored edibles which comprises mixing with the edible a small amount of ammoniated glycyrrhizin to enhance the chocolate flavor but insufficient to provide the flavor of licorice.
4. The method of claim 3 wherein not less than 1 and not more than 5 parts, by weight, of ammoniated glycyrrhizin are added per 100 parts of cocoa.
5. A cocoa-containing, chocolate-flavored edible material containing a small amount of ammoniated glycyrrhizin to enhance the chocolate flavor but insufficient to impart the flavor of licorice.
6. The product of claim 5 wherein the ammoniated glycyrrhizin is present in an amount not less than 1 nor more than 5 parts, by weight, per 100 parts, by weight, of cocoa.
7. A chocolate flavoring agent consisting principally of cocoa and ammoniated glycyrrhizin in which the ammoniated glycyrrhizin is present in an amount to provide an enhanced chocolate flavor as compared to the cocoa alone but insufficient to impart the flavor of licorice.
8. The product of claim 7 wherein the ammoniated glycyrrhizin is present in an amount not less than 1 nor more than 5 parts, by weight, per 100 parts, by weight, of cocoa.

References Cited

UNITED STATES PATENTS 1,927,041    9/1933    Mayheur    99—134
3,282,706    11/1966    Muller et al.    99—141

OTHER REFERENCES

Morris, J. M. Jr., "Chocolate Flavor Enhancer Doubles as Sweetener," Candy Industry and Confectioners Journal, vol. 125, No. 9, Nov. 2, 1965.

A. LOUIS MONACELL, *Primary Examiner.*

D. M. NAFF, *Assistant Examiner.*